United States Patent [19]

Löbach et al.

[11] 4,423,194

[45] Dec. 27, 1983

[54] POLYQUATERNARY AMMONIUM COMPOUNDS, THEIR PREPARATION, THEIR USE IN THE PRODUCTION OF PAPER AND PAPER TREATMENT AGENTS CONTAINING THEM

[75] Inventors: Wilfried Löbach, Bonn; Peter Haas, Haan; Günter Kolb; Güter Sackmann, both of Leverkusen; Joachim Probst, Cologne, all of Fed. Rep. of Germany

[73] Assignee: Bayer Aktiengesellschaft, Leverkusen, Fed. Rep. of Germany

[21] Appl. No.: 410,744

[22] Filed: Aug. 23, 1982

Related U.S. Application Data

[63] Continuation of Ser. No. 180,556, Aug. 22, 1980, abandoned.

[30] Foreign Application Priority Data

Sep. 7, 1979 [DE] Fed. Rep. of Germany ....... 2936239

[51] Int. Cl.$^3$ .............................................. C08F 8/32
[52] U.S. Cl. ................................ 525/327.6; 525/380; 525/382
[58] Field of Search ................... 525/327.6, 329.9, 380, 525/381, 382

[56] References Cited

U.S. PATENT DOCUMENTS 4,233,193 11/1980 Hochreuter ........................ 525/340

Primary Examiner—Paul R. Michl
Attorney, Agent, or Firm—Sprung, Horn, Kramer & Woods

[57] ABSTRACT

The present invention relates to new water-soluble polyquaternary compounds which are obtained by imidation of (A) specific alternating copolymers of maleic anhydride and olefines with (B) specific amines and (C) subsequent alkylation of the reaction product AB, the components (A) and (B) having the meaning given in the text of the Application. The invention furthermore relates to a process for the preparation of these water-soluble polyammonium compounds and their use as agents for improving the wet and dry tear strength of paper. The invention also relates to new intermediate products for the preparation of the compounds according to the invention.

6 Claims, No Drawings

POLYQUATERNARY AMMONIUM COMPOUNDS, THEIR PREPARATION, THEIR USE IN THE PRODUCTION OF PAPER AND PAPER TREATMENT AGENTS CONTAINING THEM

This is a continuation of application Ser. No. 180,556, filed Aug. 22, 1980, abandoned.

The invention relates to water-soluble polyquaternary compounds which are prepared by imidation of (A) alternating copolymers of maleic anhydride and olefines of the formula

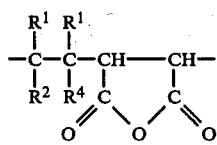

in which
$R^1$, $R^2$, $R^3$ and $R^4$ independently of one another represent hydrogen, $C_1$- to $C_8$-alkyl or aryl, preferably phenyl, which is optionally substituted by $C_1$- to $C_4$-alkyl, with a molecular weight of $>5,000$ with (B) amines of the general formula

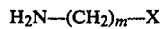

in which
m can be an integer between 2 and 5 and
X the formulae

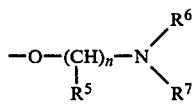 (a)

in which
n represents an integer between 2 and 5,
$R^5$ represents hydrogen or $C_1$- to $C_8$-alkyl which can be substituted by

and
$R^6$ and $R^7$ independently of one another represent $C_1$- to $C_5$-alkyl, which can be substituted by hydroxyl, or together represent $C_2$- to $C_6$-alkylene,

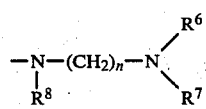 (b)

in which
$R^8$ represents $C_1$- to $C_8$-alkyl or the radical

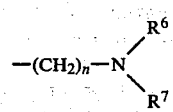

and
n, $R^6$ and $R^7$ have the abovementioned meaning,

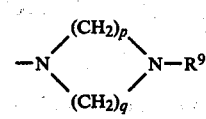 (c)

in which
p and q independently of one another stand an integer between 2 and 5 and
$R^9$ represents $C_1$- to $C_8$-alkyl, which can be substituted by hydroxyl, or the radical

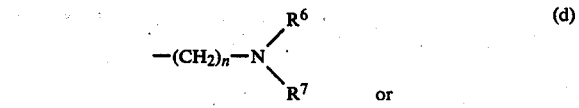 (d)

or

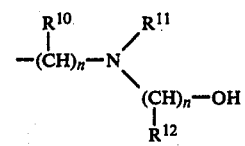

in which
$R^{10}$ and $R^{12}$ independently of one another represent hydrogen or $C_1$- to $C_8$-alkyl and
$R^{11}$ represents $C_1$- to $C_5$-alkyl or the radical

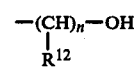

and
(C) alkylation of the reaction product AB.

The invention furthermore relates to a process for the preparation of these water-soluble polyammonium compounds and to their use as agents for improving the wet and dry tear strength of paper, and to compounds of the formulae

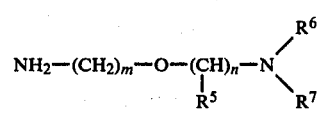 (I)

and

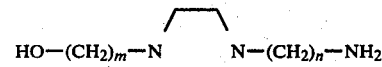 (II)

wherein
m, n, $R^5$, $R^6$ and $R^7$ have the abovementioned meaning.
Preferably, in the formulae given under A and B and in the formulae (I) and (II),
$R^1$-$R^4$ represent hydrogen, methyl or phenyl,
m, n, p and q represent 2 or 3,
$R^5$ represents water or methyl, or

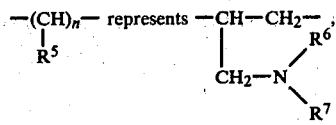

R⁶ and R⁷ represent methyl or ethyl, or together represent tetramethylene or pentamethylene,
R⁸ represent methyl, ethyl or the radical

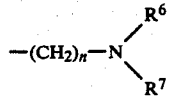

R⁹ represents methyl, ethyl, hydroxyethyl, hydroxypropyl or the radical

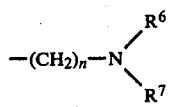

R¹⁰ and R¹² represent hydrogen or methyl and
R¹¹ represents methyl, ethyl or the radical

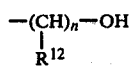

Possible olefine components for the copolymers (A) are, in particular: ethylene, propylene, butylene, isobutylene, pentylene, diisobutylene, styrene and alkylstyrenes.

Examples of the amines (B) which may be mentioned are the following:

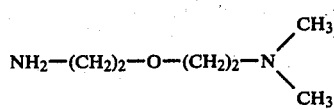

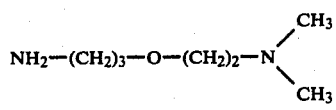

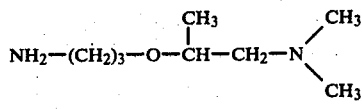

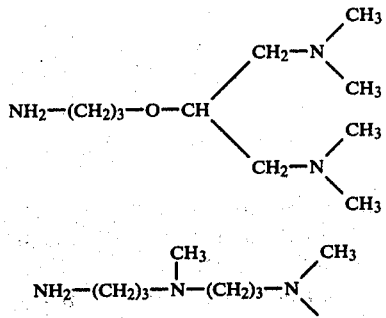

-continued

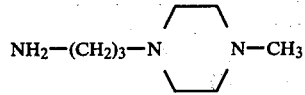

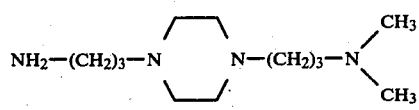

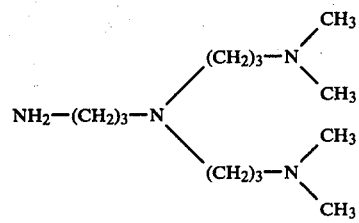

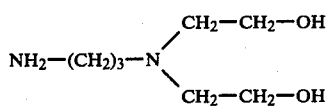

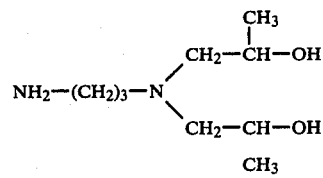

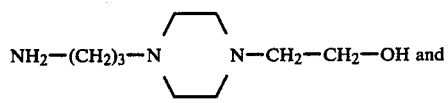

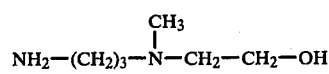

Alkylating agents (C) which can be employed are, for example, alkyl halides, such as methyl or ethyl chloride or methyl or ethyl bromide, alkyl sulphates, such as dimethyl or diethyl sulphate, or arylsulphonates, such as methyl or ethyl benzenesulphonate or methyl or ethyl toluenesulphonate, and epihalides, in particular epichlorohydrin. The products obtained with epichlorohydrin are self-crosslinking and must be acidified in order to achieve a sufficient storage stability.

The copolymers are prepared by known processes. The molecular weights of the polymers according to the invention can vary from 10,000 to 100,000.

The molecular weight at which the limit of the solubility in water lies for a given copolymer and a given amine, after alkylation has been carried out, can easily be determined by preliminary experiments. As a general rule, it can be said that copolymers with a high molecular weight require amines with several tertiary amino groups or with hydroxyalkylamino groups in order still to be water-soluble.

The imidation is advantageously carried out in a water-immiscible high-boiling solvent, such as xylene, toluene or chlorobenzene. When the water has been split off, the solvent can easily be removed by steam distillation.

The ratio of mols of primary amine to anhydride equivalents is preferably 1:1, but a slight deviation from 0.9:1 to 1:1.1 has no substantial influence on the effectiveness of the alkylated products. The imidated copolymers can be further processed most favourably in the form of alcoholic solutions.

The alkylation is as a rule carried out at pH values above 6, preferably at pH 8–9, in an aqueous/alcoholic medium, whereupon the imidated polymers, some of which are insoluble in water, dissolve.

The reaction temperature can be varied between 0° C. and 120° C., depending on the alkylating agent and the amine employed. If epihalohydrins are used, the reaction is preferably carried out at 20° to 50° C. and is stopped by adding acid, and the reaction mixture is rendered acid, for example to a pH value of 3.0–4.0, that no crosslinking occurs and water-insoluble products are thus formed.

The ratio of alkylating agent to basic nitrogen is advantageously between 0.7:1 and 1:1. The products which are best most water-soluble and most effective are thereby obtained.

A procedure which is in itself known is followed in order to increase the wet and dry strength of paper according to the process of the present invention, a procedure preferably being followed in which the ammonium compounds according to the invention are already added, in the form of aqueous solutions, to the aqueous suspension of the paper pulp and the pulp suspension is then processed to paper. The amounts of ammonium compound which are necessary to achieve the desired wet and dry strength can be determined without difficulty by preliminary experiments. In general, it is advisable to employ 1–100 parts by weight of an aqueous solution, of which the content of reaction products is 10–20% by weight, per 1,000 parts by weight of paper pulp or paper.

The acidified reaction products of the imidated copolymers with epihalohydrins are activated by adding alkali before they are added to the paper pulp suspension. The activated reaction products exhibit an exceptional increase in effectiveness.

Reaction products of imidated copolymers of maleic anhydride and α-olefines with epichlorohydrin and their use as sizing agents for paper are already known from Swiss Patent Specification No. 460,517. However, because of the nature of the amines used, only maleic anhydride/α-olefine copolymers which have molecular weights <5,000 can be employed for the preparation of the products described in that Patent Specification, since the end products otherwise become water-insoluble. Furthermore, paper which has been sized with such substances exhibits only a short-term improvement in the wet tear strength, which falls markedly, however, after soaking for a relatively long period.

The invention was thus based on the object of preparing water-soluble polyammonium compounds which have a reduced sizing effect but an improved wet and dry tear strength.

The object was achieved by using particular amines. It was thereby possible to obtain polyquaternised products which are soluble in water to the extent of more than 20% by weight, using starting copolymers which have molecular weights above 5,000.

Examples of some reaction products according to the invention and their use for providing dry strength and wet strength are described below.

PREPARATION EXAMPLES

Preparation of the copolymers A

The copolymers of maleic anhydride and the monomers diisobutylene (2,2,4-trimethylpent-1-ene), isobutylene, propylene and styrene built up in an alternating manner were prepared by a solution or suspension process according to instructions known from the literature. The products were characterised by molecular weight determinations.

(1) Maleic anhydride/diisobutylene copolymer
$\overline{M}_n \approx 20,000$ (2) Maleic anhydride/styrene
$\overline{M}_\eta \approx 34,700$; $[\eta] = 0.368 [dl/g]$ (3) Maleic anhydride/isobutylene
$\overline{M}_\eta \approx 100,000$; $[\eta] = 0.86 [dl/g]$ (4) Maleic anhydride/propylene
$\overline{M}_n \approx 50,000$ Preparation of the amines B (1) 2-Dimethylaminoethyl 3-aminopropyl ether (a) 2-Dimethylaminoethyl 2-cyanoethyl ether 530 g of acrylonitrile are added dropwise to 890 g (10 mols) of dimethylaminoethanol and 0.3 g of dissolved sodium at room temperature. The mixture is left to stand for 24 hours and low-boiling constituents are distilled off.

Yield: 1,390 g (94% of theory)

(b) Hydrogenation 1,350 g of 2-dimethylaminoethyl 2-cyanoethyl ether are hydrogenated in 150 ml of methanol and 800 ml of ammonia using 120 g of Raney cobalt, at 110° C.

Boiling point$_{1.2}$: 55° C.

Yield: 1,250 g (90% of theory)

Purity: (according to the gas chromatogram): 98%

Equivalent weight: 147, calculated: 146.

(2) 2-Dimethylamino-1-methyl-ethyl 3-aminopropyl ether (a) 2-Dimethylamino-1-methyl 2-cyanoethyl ether This compound is obtained analogously to Example 1a, from 412 g (4 mols) of dimethylamino-2-propanol and 0.3 g of dissolved sodium with 212 g of acrylonitrile.

Yield: 604 g (97% of theory)

(b) Hydrogenation 604 g of 2-dimethylamino-1-methyl 2-cyanoethyl ether are hydrogenated in 900 ml of methanol and 300 ml of ammonia using 60 g of Raney cobalt, at 90° C.

Boiling point$_{0.05}$: 55° C.

Yield: 618 g (100% of theory)

Purity (according to the gas chromatogram): 96%.

(3) N-Methyl-N'-aminopropyl-piperazine (a) N-Methyl-N'-2-cyanoethyl-piperazine

This compound is obtained analogously to Example 1a from 500 g (5 mols) of methylpiperazine in 500 ml of methanol and 265 g (5 mols) of acrylonitrile.

Yield: quantitative (b) Hydrogenation

The title compound is obtained from 765 g (5 mols) of N-methyl-N'-2-cyanoethyl-piperazine in 800 ml of methanol and 400 ml of ammonia using 80 g of Raney cobalt, at 90° C.

Boiling point$_{0.35}$: 60° C.

Yield: 700 g (87% of theory)

Purity (according to the gas chromatogram): 98.5%.

(4) N,N-Bis-(dimethylaminopropyl)-1,3-diaminopropane (a) Bis-(dimethylaminopropyl)-2-cyanoethyl)-amine This compound is obtained analogously to Example 1a and 1,870 g (10 mols) of bis-(dimethylaminopropyl)-amine and 530 g (10 mols) of acrylonitrile in 1,000 ml of methanol.

(b) Hydrogenation 2,400 g of bis-(dimethylaminopropyl)-2-cyanoethylamine in 1,000 ml of methanol and 800 ml of ammonia using 90 g of Raney cobalt, at 100° C.

Boiling point$_{0.05}$: 90°–95° C.
Yield: 2,220 g (91% of theory)
Purity (according to the gas chromatogram): 99%

(5) 1,3-Bis-dimethylamino-2-propyl 3-amino-n-propyl ether (a) 1,3-Bis-dimethylamino-2-propyl 2-cyano-ethyl ether This compound is obtained analogously to Example 1a from 1,022 g (7 mols) of 1,3-bis-dimethylamino-2-propanol, 0.5 g of dissolved sodium and 371 g (7 mols) of acrylonitrile.

Yield: quantitative (b) Hydrogenation 500 g of 1,3-bis-dimethylamine-2-propyl 2-cyanoethyl ether are hydrogenated using 500 ml of ammonia and 75 g of Raney cobalt, at 90° C. and under 100 bars.

Boiling point$_{0.05}$: 65° C.
Yield: 440 g (86% of theory)
Purity (according to the gas chromatogram): 93%

(6) N,N-Bis-(2-hydroxyethyl)-1,3-diaminopropane (a) Bis-(2-hydroxyethyl)-cyanoethylamine This compound is obtained from 210 g (2 mols) of diethanolamine in 300 ml of methanol and 106 g (2 mols) of acrylonitrile; the mixture is concentrated after 3 hours.

Yield: quantitative.

(b) Hydrogenation 313 g of bis-(2-hydroxyethyl)-cyanoethylamine are hydrogenated using 60 g of Raney cobalt and 300 ml of ammonia, at 100° C. and under 100 bars.

Boiling point$_{0.2}$: 135° C.
Yield: 250 g (78% of theory)

(7) N-2-Hydroxyethyl-N'-3-aminopropyl-piperazine (a) N-2-Hydroxyethyl-N'-2-cyanomethyl-piperazine This compound is obtained from 650 g (5 mols) of 2-hydroxyethylpiperazine in 300 ml of methanol and 265 g (5 mols) of acrylonitrile; the mixture is concentrated after two hours.

Yield: quantitative.

(b) Hydrogenation 913 g of N-2-hydroxyethyl-N'-2-cyanoethyl-piperazine are hydrogenated using 130 g of Raney cobalt and 800 ml of ammonia, at 90° C. and under 100 bars.

Boiling point$_{0.05}$: 122° C.
Yield: 706 g (76% of theory)

(8) N,N-Bis-(2-hydroxy-propyl)-1,3-diaminopropane (a) Bis-(2-hydroxy-propyl)-cyanoethylamine This compound is obtained from 515 g (3.86 mols) of diisopropanolamine in 300 ml of methanol and 204 g (3.86 mols) of acrylonitrile; the mixture is concentrated after 2 hours.

Yield: quantitative.

(b) Hydrogenation 711 g of bis-(2-hydroxy-propyl)-cyanoethylamine are hydrogenated using 700 ml of methanol, 350 ml of ammonia and 80 g of Raney cobalt, at 100° C. and under 70 bars.

Boiling point$_{0.8}$: 147° C.
Yield: 605 g (83% of theory)
Purity (according to the gas chromatogram): 97%

The cyanoethylation reactions were carried out by methods which are in themselves known, in accordance with those of H. A. Bruson, Organic Reactions 5, 79–135 (1949) and P. Kurtz in Houben-Weyl, Volume VIII, 340–344 (1952).

Imidation of the copolymers A with the amines B

General instructions

The copolymer A is suspended in boiling xylene. One mol of amine B per equivalent of anhydride is rapidly added dropwise. The mixture is boiled for one hour, using a water separator. This period is sufficient for complete reaction to be achieved. The solvent is distilled off with steam and the residue is dried in vacuo. If it is particularly tacky, the same amount by weight of isopropanol is added and the solid is dissolved, whilst stirring and warming slightly.

(1) From 105 g of A 1 (0.5 mol of the formula weight) and 73 g of B 1 (0.5 mol); N calculated: 8.28%; found: 8.19%

(2) From 105 g of A 1 (0.5 mol of the formula weight) and 80 g of B 2 (0.5 mol)

(3) From 105 g of A 1 (0.5 mol of the formula weight) and 78.5 G of B 3 (0.5 mol)

|  | C | H | N |
|---|---|---|---|
| Calculated | 68.76 | 10.02 | 12.03 |
| Found | 68.5 | 10.0 | 11.5 |

(4) From 105 g of A 1 (0.5 mol of the formula weight) and 122 g of B 4 (0.5 mol)

Equivalent weight calculated: 145; found: 146

(5) From 51 g of A 2 (0.25 mol of the formula weight) and 39.5 g of B 3 (0.25 mol)

|  | C | H | N |
|---|---|---|---|
| Calculated | 70.17 | 8.19 | 12.28 |
| Found | 69.4 | 8.7 | 12.0 |

(6) From 77 g of A 3 (0.5 mol of the formula weight) and 73 g of B 1 (0.5 mol)

N calculated: 9.93 found: 9.49

(7) From 77 g of A 3 (0.5 mol of the formula weight) and 122 g of B 4 (0.5 mol)

(8) From 70 g of A 4 (0.5 mol of the formula weight) and 78.5 g of B 3 (0.5 mol)

|  | C | H | N |
|---|---|---|---|
| Calculated | 64.5 | 8.96 | 15.05 |
| Found | 63.7 | 9.2 | 14.5 |

(9) From 70 g of A 4 (0.5 mol of the formula weight) and 122 g of B 4 (0.5 mol)

Equivalent weight calculated: 122 found: 127

Alkylation of the imidation products AB (a) Alkylation with epichlorohydrin

General instructions

The product AB is dissolved in the same amount by weight of isopropanol. Twice the amount of water is then added. The product AB thereby in general precipitates in the form of an emulsion. One mol of epichlorohydrin is then added per mol of tertiary amine. The product subsequently dissolves.

The condensation reaction is carried out at 40° C. until the viscosity has reached about 100 mPas, concentrated hydrochloric acid is then added in an amount such that a pH value of 3.5 results, and the mixture is made up to a 20% strength solution with water.

(1) From 27 g of AB 1 and 9.2 g of epichlorohydrin
Viscosity: 110 mPas/25° C.

(2) From 35 g of AB 2 and 9.2 g of epichlorohydrin
Viscosity: 98 mPas/25° C.

(3) From 35 g of AB 3 and 18 g of epichlorohydrin
Viscosity: 130 mPas/25° C.

(4) From 44 g of AB 4 and 28 g of epichlorohydrin
Viscosity: 122 mPas/25° C.

(5) From 34 g of AB 5 and 18 g of epichlorohydrin
Viscosity: 80 mPas/25° C.

(6) From 28 g of AB 6 and 9.2 g of epichlorohydrin
Viscosity: 115 mPas/25° C.

(7) From 38 g of AB 7 and 28 g of epichlorohydrin
Viscosity: 97 mPas/25° C.

(8) From 28 g of AB 8 and 18 g of epichlorohydrin
Viscosity 125 mPas/25° C.

(9) From 37 g of AB 9 and 28 g of epichlorohydrin
Viscosity: 114 mPas/25° C.

(b) Alkylation with dimethyl sulphate

This alkylation is carried out analogously to (a), but with 1 mol of dimethyl sulphate per mol of tertiary amine. The mixture is stirred at 80° C. for 1 hour and then made up to a 20% strength solution. Since the products thus obtained are not self-crosslinking, acidification can be dispensed with.

(10) From 38 g of AB 7 and 38 g of dimethyl sulphate
Viscosity: 50 mPas/25° C.

(11) From 37 g of AB 9 and 38 g of dimethyl sulphate
Viscosity: 30 mPas/25° C.

Use Example 20 g of the 5% strength reaction products C 1-9, adjusted to pH 8, are added to 100 kg of a 0.25% strength suspension, prepared in the customary manner, of a mixture of 84 parts by weight of bleached sulphite pulp with a Schopper-Riegler freeness of 35° and 16 parts by weight of titanium dioxide. Of the products C 10 and 11, 5 g of the 20% strength solution were employed without activation. The paper pulp suspension is then diluted with 500 kg of water and processed, at a pH value of 6-7, on a sheet-forming unit (Rapid-Köthen apparatus), to give paper weighing 80 g/m², the paper formed being first dried at 95° C. in vacuo under a pressure of 20 mm/Hg for 5 minutes and then being heated for a further 10 minutes to 110° C.

Compared with paper which has been prepared with wet strength agents based on polyamidoamine/epichlorohydrin, for example according to U.S. Pat. No. 3,640,840, Example (1b), the paper thus obtained has an improved wet strength and dry strength when the products AB 1-9 are employed and an improved dry strength when the products 10 and 11 are employed.

The increase in the wet and dry strength can be seen from the table.

TABLE

| Reaction product | Breaking load (Newton) dry | wet |
|---|---|---|
| none | 412 | 32 |
| Comparison Example 1b of U.S. Pat. Specification 3,640,840 | 620 | 117 |
| 1 | 655 | 154 |
| 2 | 678 | 166 |
| 3 | 632 | 142 |
| 4 | 932 | 219 |
| 5 | 802 | 183 |
| 6 | 760 | 163 |
| 7 | 918 | 213 |
| 8 | 822 | 191 |
| 9 | 912 | 208 |
| 10 | 680 | 98 |
| 11 | 671 | 93 |

We claim:

1. A water-soluble polyquaternary compound obtained by reaction of:

(A) a copolymer of maleic anyhdride with an olefin selected from the group consisting of styrene, di-isobutylene, isobutylene and propylene, said copolymer having a number average molecular weight of at least 10,000, with (B) an amine of the general formula $$H_2N-(CH_2)_m-X$$

in which m can be an integer between 2 and 5 and
X the formulae

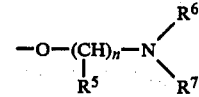   (a)

in which n represents an integer between 2 and 5,
$R^5$ represents hydrogen of $C_1$- to $C_8$-alkyl which can be substituted by

and $R^6$ and $R^7$ independently of one another represent $C_1$- to $C_5$-alkyl, which can be substituted by hydroxyl, or together represent $C_2$- to $C_6$-alkylene,

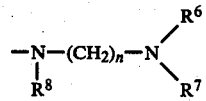   (b)

in which $R^8$ represents $C_1$-$C_8$-alkyl or the radical

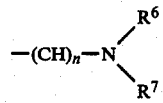

and n, $R^6$ and $R^7$ have the above-mentioned meaning

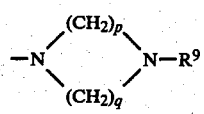   (c)

in which p and q independently of one another stand for an integer between 2 and 5 and $R^9$ represents $C_1$- to $C_8$-alkyl, which can be substituted by hydroxyl, or the radical $$-(CH_2)_n-N\begin{matrix}R^6\\\\R^7\end{matrix} \quad (d)$$

or $$-(CH)_n-N\begin{matrix}R^{10}\\\\(CH)_n-OH\\|\\R^{12}\end{matrix}\begin{matrix}R^{11}\end{matrix}$$

in which $R^{10}$ and $R^{12}$ independently of one another represent hydrogen or $C_1$- to $C_8$-alkyl and $R^{11}$ represents $C_1$- to $C_5$-alkyl or the radical $$-(CH)_n-OH\\|\\R^{12}$$

and;

(C) alkylation of the reaction product of said copolymer with said amine.

2. A water soluble quaternary compound according to claim 1, wherein X repesents $$-N-(CH_2)_n-N\begin{matrix}R^6\\\\R^7\end{matrix}\\|\\R^8$$

in which $R^8$ represents $C_1$- to $C_8$-alkyl or the radical $$-(CH_2)_n-N\begin{matrix}R^6\\\\R^7\end{matrix}$$

3. A process according to claim 2, wherein said amine of the formula $H_2N-(CH_2)_m-X$ is N,N-bis-(dimethylaminopropyl)-1,3-diminopropane.

4. Water-soluble polyquaternary compounds according to claim 1, characterised in that 2-dimethylaminoethyl 3-aminopropyl ether, 2-dimethylamino-1-methylethyl 3-amino-propyl ether, N-methyl-N'-3-amino-propylpiperazine and N,N-bis-(dimethylaminopropyl)-1,3-diaminopropane are employed as the amines B.

5. Water-soluble polyquaternary compounds according to claim 1, characterised in that dimethyl sulphate and epichlorohydrin is employed as the alkylating agent C.

6. Auxiliary for the production of paper, which contains a polyquaternary compound according to claim 1.

* * * * *

UNITED STATES PATENT AND TRADEMARK OFFICE
CERTIFICATE OF CORRECTION

PATENT NO. : 4,423,194

DATED : Dec. 27, 1983

INVENTOR(S) : Wilfried Löbach et al

It is certified that error appears in the above-identified patent and that said Letters Patent is hereby corrected as shown below:

COLUMN 12, LINE 15 Delete "process" and insert --compound--.

Signed and Sealed this

Fifteenth Day of January 1985

[SEAL]

Attest:

Attesting Officer

GERALD J. MOSSINGHOFF

Commissioner of Patents and Trademarks